United States Patent [19]

Mickelson

[11] 3,755,196

[45] Aug. 28, 1973

[54] HYDROTREATING CATALYST

[75] Inventor: Grant A. Mickelson, Yorba Linda, Calif.

[73] Assignee: Union Oil Company of California, Los Angeles, Calif.

[22] Filed: Apr. 1, 1971

[21] Appl. No.: 130,515

Related U.S. Application Data

[63] Continuation-in-part of Ser. No. 837,340, June 27, 1969, abandoned, which is a continuation-in-part of Ser. No. 761,322, Sept. 20, 1968, abandoned.

[52] U.S. Cl............. 252/435, 252/437, 252/455 R, 252/458, 252/459
[51] Int. Cl................................................ B01j 11/82
[58] Field of Search............... 252/435, 455 R, 458, 252/459

[56] References Cited
UNITED STATES PATENTS

| | | | |
|---|---|---|---|
| 3,287,280 | 11/1966 | Colgan et al. | 252/435 |
| 3,232,887 | 2/1966 | Pessimisis | 252/435 |
| 3,442,794 | 5/1969 | Van Helden et al. | 208/111 |
| 3,459,678 | 8/1969 | Hagemeyer, Jr. et al. | 252/435 |
| 3,474,041 | 10/1969 | Kerr | 252/435 X |
| 3,629,146 | 12/1971 | Adams | 252/435 |
| 3,684,695 | 8/1972 | Neel et al. | 208/110 |

Primary Examiner—C. F. Dees
Attorney—Milton W. Lee, Richard C. Hartman and Lannas S. Henderson

[57] ABSTRACT

Highly active catalysts of molybdenum and Group VIII metals are prepared by impregnating a support with highly stable solutions of the active metal compounds and an acid of phosphorus having a $P/MoO_3$ weight ratio of 0.1–0.25 and an initial pH of 1 to about 2.

20 Claims, No Drawings

HYDROTREATING CATALYST

BACKGROUND AND DESCRIPTION

This application is a Continuation-In-Part of my copending application, Ser. No. 837,340, filed June 27, 1969 which in turn was a Continuation-In-Part of application Ser. No. 761,322, filed Sept. 20, 1968, both of which are now abandoned.

Hydrotreating catalysts comprising a Group VIII metal, particularly cobalt, or nickel, a Group VI metal, particularly molybdenum or tungsten, or their oxides or sulfides, and phosphorus on an alumina or silica-stabilized alumina base have been disclosed in U. S. Pat. Nos. 3,232,887 and 3,287,280. Such catalysts are extensively employed for denitrogenation or desulfurization of petroleum feed stocks as well as for other hydrogenation reactions. U. S. Pat. No. 3,287,280, in particular, describes methods and impregnating solutions for preparing such catalysts consisting of molybdenum and nickel salts stabilized with phosphoric acid in an aqueous medium. This patent discloses the desirability of maintaining the amount and ratio of the constituents of the impregnating solution within relatively narrow ranges.

It has now been found that the ratio of phosphorus-to-Group VI metal, particularly molybdenum, employed in such solutions is critical, and that the activity of the resulting catalysts is substantially enhanced by the use of a higher phosphorus-to-molybdenum metal ratio than that employed in the conventional catalyst preparations. In addition, it has been found that proper regulation of the pH of the solution is essential in order to obtain maximum catalytic activity.

For catalysis of denitrogenation or desulfurization reactions, the catalytic metals are generally employed in the form of oxides in association with a carrier material. Conventionally, the catalytic metals are applied to the carrier by impregnation with a solution of a compound of the metal, followed by calcination to convert the catalytic metal compounds to oxides. The use of an acid, such as phosphoric acid, as a component of the impregnating solution is disclosed in the above-mentioned U. S. patents. The disclosed function of the acid is the stabilization of the impregnating solution containing both the Group VI and the Group VIII metal compound.

However, I have found that stabilization of the impregnating solution per se affords a solution for only one of the major problems associated with the impregnation of catalyst with Group VIII and Group VI metal components. It is generally recognized that the formation of an evenly distributed layer of the active components such as the metals, oxides, or sulfides throughout the entire surface area of the catalyst support enables the most efficient utilization of the entire catalyst surface area, i.e., contact surface, and thereby provides the most active catalyst in most applications. The impregnation of such catalysts supports with the active components herein discussed by the use of "unstabilized" solutions is subject to several distinct disadvantages. For example, precipitation of the active components from solution even prior to contact with the catalyst support occurs to such a significant extent that a considerable amount of the active components are lost as waste material. The catalysts thus formed do not comprise an evenly distributed active component layer. In addition, the active components are deposited on the support surface as crystalline aggregates resulting in a heterogeneous non-uniform catalytic surface of inferior activity. Precipitation of the active components from the impregnating solution becomes particularly acute at higher concentrations. For this and other reasons hereinafter discussed, it has previously been necessary to employ impregnating solutions of such reduced concentration that multiple impregnations were necessary to deposit the desired amount of active material on the support surface. The multi-step impregnation procedure necessitated by solution instability generally involves the repeated cyclic contact of a support such as silica or alumina with an impregnating solution of relatively low concentration. Intermittent partial drying between impregnation cycles is often necessary to render the deposited materials in the form less susceptible to extraction on subsequent contact with additional impregnating medium. This procedure involves a rather involved cyclic batch operation and is much less attractive than a simpler single step or continuous impregnation-calcination procedure. However, the use of that simplified procedure is not advisable due to the instability of the impregnating solutions. The catalyst thus produced are of inferior activity. This result is believed to be attributable to the distribution of active components on the surface of the support medium in a non-uniform manner as relatively large crystalline aggregates.

The same disadvantages are associated with the use of the so called stabilized impregnating solutions heretofore employed. The stability of those solutions is not sufficient to enable the use of impregnating media of sufficient concentration to deposit the desired amount of active components on a catalyst support in a single step. An even distribution cannot be achieved in a single step due to the fact that impregnating solutions of sufficiently high concentration cannot be maintained in a stable form.

I have also observed that even the catalysts produced by multi-step impregnation with the dilute stabilized solutions of the prior art are markedly inferior to those obtainable by the procedures herein described. The stabilized solutions of the prior art, such as those discussed in U. S. Pat. Nos. 3,232,887 and 3,287,280 are more stable in the classical sense than are solutions containing no stabilizing component. Precipitation from these stabilized solutions is less likely in the absence of a support surface, provided the concentration of active components in the impregnating solution is relatively low. However, the active components deposit from these solutions on the support surface as crystallites. This form of deposition is apparently due to the promotion of crystallization on the active components by the support surface. Whatever the cause of crystallite formation, it is understandable that once crystallites form they tend to promote continued crystallization. The result is isolated crystal growth and crystalline aggregate formation in the pores and on the surface. The obvious consequence of this sequence of events is the formation of an unevenly distributed layer of active components on the surface of the support matrix. Such heterogeneity of the catalyst surface is believed to be accountable for the lower activity observed.

The problems observed in the impregnation step are not the only factors involved in forming an active catalyst. The formation of a homogeneous catalyst surface alone does not solve all the problems involved in the preparation of these catalysts. On the contrary, I have observed that the manner in which the catalyst is treated subsequent to impregnation has a dramatic influence on the activity of the finished product. It has previously been considered most expeditious to expose the impregnated support to a preheated furnace in which volatile materials, e.g., water, are rapidly expelled. However, I have discovered that drying of the impregnated support should be conducted at a rate much less than the maximum in order to obtain the most active product. Although the reasons for this result are not known with certainty, it is presumed that either rapid crystallization or steaming of that catalyst are at least partially accountable. It may be that accelerated drying and the corresponding rapid increase in the solution concentration on the surface promote the formation of crystallites and crystalline aggregates.

It is therefore one object of this invention to provide a catalyst of increased activity. It is another object of this invention to provide a highly active catalyst composite of refractory oxides, Group VIII and Group VI metals, oxides and/or sulfides. It is another object of this invention to provide an improved catalyst preparation method. It is another object of this invention to provide an improved method for impregnating refractory oxide supports with catalytically active materials. It is another object of this invention to provide catalyst impregnating solutions of improved stability. It is another object of this invention to provide a catalyst impregnation procedure which enables the formation of evenly distributed catalytically active contact areas by a single step impregnation procedure. It is another object of this invention to provide an improved method for drying impregnated catalyst composites. Yet another object of this invention is the provision of an impregnated catalyst drying procedure which enables the formation of homogeneous catalytically active component contact surfaces.

DETAILED DESCRIPTION

According to the present invention, it has been found that the use of amounts of phosphoric acid, particularly relative to that of Group VI metal, greater than those taught by the prior art is not only effective in stabilizing the impregnating solution but also substantially enhances the catalytic activity of the finished catalyst. The reason for the enhanced activity of the catalysts of the invention is not known with certainty but is believed to relate to the fact that during the preparation of the catalysts of the invention an amorphous colloidal film of the impregnating materials is deposited on the surface of the support, whereas, in the prior art methods the impregnating materials are deposited in crystalline form. This is believed to result in more uniform distribution of the molybdenum and nickel ions on the surface of the carrier throughout its pore structure when the process of the invention is employed. It can, in fact, be shown that solutions prepared according to the process of the invention do not crystallize or precipitate upon standing for months at room temperature. Moreover, no crystallized or precipitated material is formed upon drying the solutions in an evaporating dish or in a thin film on glass, metal or ceramic surfaces; instead, a transparent colloidal film is formed. Solutions outside the limits of concentration and pH of the invention crystallize or precipitate before or during drying and yield opaque films on surfaces. The effectiveness of these is demonstrated by the illustrative examples.

As previously mentioned, the conditions necessary to produce an amorphous as opposed to crystalline deposit, at the relatively high concentrations necessary to produce a catalyst of the desired composition in a single step are quite critical. It is presently felt that the most critical of these process conditions are the pH of the solution and the $P/MoO_3$ weight ratio. The pH necessary to achieve this result in the systems herein described must be within the range of 1 to about 2 for the solution initially contacted with the substrate. I have observed that some increase in pH values slightly above 2, i.e., up to about 2.5, can be tolerated during the latter stages of impregnation when the concentration of active components is substantially diminished due to the deposition of those components on the catalyst support. However, the pH should be maintained as close as possible to about 1.5, i.e., from 1.2 to about 1.8. Deviations from that midpoint in either direction render the impregnating solution less stable. The greater the deviation, the greater the prospect of crystalline deposite formation and crystallite aggregation on the support surface.

In accordance with another embodiment of this invention a catalyst comprising a composite of a Group VIII and Group VI metal on a refractory oxide support of increased activity is prepared by drying an impregnated support under relatively mild conditions prior to calcination. It is presently preferred that the impregnated catalyst be heated gradually to a temperature only slightly in excess of the temperature necessary to expel the impregnating solution solvent retained on the catalyst. As this solvent is generally water, it is presently preferred that the drying temperature be allowed to gradually approach a temperature of at least about 220°F, preferably from 220°F to about 250°F. It is presently preferred that the heat up rate not exceed about 20 F°/minute. This temperature is then maintained for a period sufficient to expel substantially all of the solvent from the substrate. It is generally desirable to reduce the physisorbed water content by this procedure to less than about 4 wt. percent and preferably less than about 2 wt. percent based on total catalyst weight. This generally requires drying periods of about 10 minutes to about 10 hours, depending on the temperature employed, the rate at which air is passed over the composite, the depth of the composite layer and the particle size. Shorter drying periods can, of course, be tolerated at the higher temperatures. A corollary advantage, in addition to the prevention of crystallite formation, is accomplished by this procedure in that steaming and consequent decrepitation of the catalyst particles are avoided. These deleterious effects appear to result from rapid heating to a point substantially above the boiling point of the solvent which results in the formation of substantial amounts of steam within the interior pore volume of the catalyst support. Although the prevention of this latter effect is believed to be less critical than the prevention of crystallite formation, it is desirable and is a corollary benefit of the preferred drying procedure.

It should be observed that the drying procedure referred to is not a necessary antecedent of the described impregnation procedure. Although rapid drying is believed to favor the formation of crystallites, the extent of aggregate formation on drying is not nearly so great as to completely dissipate the advantage of the homogeneous active component dispersion accomplished during the described impregnation procedure. Similarly the beneficial results ascribed to the preferred drying procedure are not limited to supports prepared by the impregnation procedure detailed herein. However, the advantage of this approach is more apparent when the impregnated support is relatively free of crystalline deposits prior to drying. The observance of rigid controls during the drying step would obviously be of little benefit with regard to crystallite formation in systems wherein a substantial proportion of the active components are already present in the form of crystalline aggregates due to the manner of impregnation. However, several advantages, such as the prevention of particle decrepitation, are realized regardless of the physical form of the active metal deposit.

The required amount of phosphorus is most conveniently expressed as the ratio of the weight of elemental phosphorus to the weight of the Group VI metal oxide. For example, in the specific examples below, the amount of phosphorus is expressed in terms of the phosphorus-to-molybdenum oxide weight ratio, i.e., $P/MoO_3$. It has now been found that this ratio should be at least about 0.1 in order to achieve the desired improvement in the catalytic activity. On the other hand, the use of too high a concentration of phosphorus generally results in diminished catalytic activity. Consequently the $P/MoO_3$ ratio in the product should be within the range of 0.1 to about 0.25, preferably from 0.12 to about 0.23.

Catalysts having these compositions are conveniently prepared by single step pore saturation techniques with solutions having $P/MoO_3$ ratios corresponding to those desired in the calcined product. The solutions generally contain from 10 to 30, usually about 17 to about 30 wt.% $MoO_3$, about 1 to about 10, preferably 1 to 8 wt. percent of the selected Group VIII metal oxide and 1 to about 6 wt. percent phosphorus on an equivalent basis. However, when the preferred single step pore saturation method is employed the solution preferably contains the equivalent of 17 to about 24 wt.% $MoO_3$, 1 to about 5 wt. percent of the Group VIII metal oxide and 2 to about 6 wt. percent phosphorus.

When impregnation is accomplished by prolonged immersion of the foraminous base with excess solution, somewhat lower active component concentrations can be employed. For example, the equivalent oxide mole ratios can be within the range of 10 to 17 wt.% $MoO_3$, 2 to 10, preferably 2 to 4 wt. percent of the Group VIII metal oxide and 1 to 2 wt. percent equivalent elemental phosphorus. In these systems the $P/MoO_3$ ratio is preferably somewhat lower than in the pore saturation techniques since phosphorus is deposited at a faster rate than is the molybdenum or Group VIII component. Higher pH, e.g, up to about 2.5 can also be tolerated in the more dilute solutions. However, it is still preferable to assure that the initial pH of even these dilute solutions is within the range of 1 to about 2.

Group VIII metals, suitable for use in the invention are iron, cobalt and nickel, ruthenium, rhodium, palladium, osmium, iridium and platinum. The most active Group VIII and Group VI metals are cobalt, nickel, molybdenum and tungsten. The impregnating systems of this invention are particularly attractive when preparing catalysts of molybdenum and a Group VIII metal, particularly nickel, due to the relative instability of molybdenum containing solutions.

Optimum proportions of the molybdenum and the Group VIII metals in the finished catalyst will vary over a considerable range, again depending on the particular metals, the reaction in which the catalyst is employed, the carrier, etc. Optimum proportions are best determined experimentally and can readily be ascertained by one of ordinary skill in the art. Generally the Group VIII metal, based on the oxide, will comprise about 1 to 10, preferably 1 to 6 wt. percent of the catalyst, with the $MoO_3$ comprising about 5 to 40, preferably 10 to 20 wt. percent of the catalyst.

The required phosphorus-to-Group VI metal oxide in the finished catalyst is obtained by employing suitable concentrations of the phosphorus acid and the Group VI metal compound in the impregnating solution. Suitable concentrations will, of course, vary considerably with the particular Group VI and Group VIII metal compounds, the phosphorus acid, the carrier, the pH and temperature of the impregnating solution, method of effecting the impregnation, etc., and are best determined empirically. For example, the most preferred acid of phosphorus concentration will not generally be exactly the same in systems employing different forms of molybdenum or nickel.

Orthophosphoric acid is the preferred source of the phosphorus component of the catalyst of the invention. However, other phosphorus acids such as metaphosphoric acid, pyrophosphoric acid, phosphorous acid, etc., may be used. The compound of the Group VI metal, preferably molybdenum, can be any one or a combination of a variety of substances which have sufficient solubility in the solution to enable the deposition of the desired amount of metal. Illustrative compounds are the acids, oxides, and the simple and complex salts such as molybdenum trioxide, molybdenum blue, molybdic acid, ammonium dimolybdate, ammonium phosphomolybdate, ammonium heptamolybdate, nickel and cobalt containing molybdates and phosphomolybdates and the like. Molybdenum is presently preferred since the resultant components are the more active conventional components.

The presently preferred Group VIII metal sources are the salts of strong acid anions. Exemplary of such anions are nitrate, sulfate and the halides, particularly bromide, chloride and fluoride anions. This preference is due primarily to the fact that the strong acid anions dissociate on admixture with the acid of phosphorus and the molybdenum source to form the corresponding acid. The strong acids are necessary to reduce the pH to a point within the essential range, i.e., 1 to about 2, at the preferred concentration levels of the respective metal sources. The nitrates are presently the preferred source of the Group VIII metal, nickel nitrate being particularly preferred due to the high activity of the resultant catalyst. Ammonium heptamolybdate is the presently preferred molybdenum source due to its high solubility. The anions other than nitrates are generally less preferred due to significant difficulties associated with their use. For example, the halides, derived from the Group VIII metal halide source, are useful in preparing these compositions but result in the evolution of the acidic halide or hydrogen halide gas upon drying and/or calcination. These materials are highly corrosive and are preferably avoided. The sulfate, on the other hand, is somewhat more difficult to keep in the original solution, making it advisable to employ slightly elevated temperatures, i.e., from 100°F to about 150°F, depending on the concentrations of the Group VIII metal sulfate. However, the use of the sulfate salt does have a distinct advantage. In the preparation of sulfided catalyst the conditions of calcination can be controlled so that the sulfate is not completely driven off and can be chemically reduced to produce a sulfided composite having a much more homogeneous distribution of sulfur than could otherwise be achieved. For example, the sulfate reduction can be conveniently carried out by exposing the calcined catalyst to a reducing atmosphere of hydrogen, carbon monoxide, etc.

A portion of the Group VIII metals can also be added in the form of salts of weak acids or as the hydroxides when it is desirable to raise the pH of the impregnation solution by this procedure. For example, if the admixture of the desired amounts of the active metal salts and acid of phosphorus results in a formation of a solution having a pH somewhat lower than desired in a particular application, the pH can be raised by the addition of a Group VIII metal base such as nickel or cobalt hydroxides and carbonates. However, this procedure is not presently preferred in that it requires the commensurate correlation of pH and active metal concentrations. As a result it is presently more preferred to raise the pH when it is initially lower than desired by the addition of a base not having a metal cation, such as ammonia. In any event, where base addition is employed to modify the initial pH, the amount of added base should not be so great as to increase the pH to a value outside the prescribed range.

Several procedural steps can be employed in the impregnation of the catalyst substrate with the compositions referred to. One such method, entitled the spray technique, involves spraying the support with a solution of the desired composition. The single-dip or pore volume method involves dipping the support in the solution for a period sufficient to fill the pores with impregnating medium. The application of vacuum is generally preferred in the latter approach. The impregnating solution can more readily displace air trapped in the interior pore volume of the catalyst support at reduced pressures.

The amount of active components retained on the support will depend largely on the pore volume and adsorption capability of the support. Consequently, the characteristics of the support must be taken into account in determining the conditions necessary to obtain a composite of predetermined composition. In general, the preferred supports, e.g., alumina and silica-stabilized alumina, will have pore volumes of 0.6 to about 1.4 cc/gram and adsorption capacity sufficient to retain the desired amount of solution in a single step. Pore size should also be taken into account in designing the most appropriate systems for the impregnation of a given support. As a general rule more care should be taken in the preparation of relatively large pore size catalysts. Better deposit homogeneity and higher activity are obtained by using longer aging times prior to drying and more gradual drying procedures. These observations are particularly applicable to the impregnation of acid leached supports in which a portion of the pores are usually fairly large.

Following either of these procedures the impregnated support can be dried and calcined to produce a catalyst having the desired active metal concentrations, provided the concentration of the active metals in the solution is sufficient to deposite the desired amount of active metal compound on the support in a single step. This is one significant advantage of these novel solutions. The stability of solutions of much higher active component concentration can be maintained for considerable periods even in the presence of inorganic supports. When a single step approach is employed it is, of course, necessary to incorporate a definite amount of each active constituent into the impregnating medium and maintain the proper ratios between the several constituents per unit volume of solution in order to obtain a finished catalyst of the desired composition. It is also preferable to age the impregnated particles for at least about 30 minutes and preferably up to about 8 hours before drying and calcining. Aging after pore saturation, in the absence of excess solution, under mild conditions i.e., 70°F, to about 150°F, results in more even distribution of active components and improved activity.

Additional precaution should be taken when a support material containing aluminum ions is exposed to excess solution at relatively low pH. It is believed that certain constituents of the impregnating solution, particularly the acid of phosphorus, react with aluminum and degrade the support, foul the impregnating solution and result in the formation of undesirable chemical forms on the finished catalyst. As a result, the duration of contacting, particularly with alumina containing supports, is preferably limited to less than about 6 minutes.

Another impregnating method which has found wide application due to the previous necessity for maintaining relatively low active component concentrations is the cyclic or multi-dip procedure wherein the active support is repeatedly contacted with impregnating solution with or without intermittent drying. As previously mentioned, this procedure is less desirable in that it necessitates the use of procedures far more complicated than the single-dip or spray technique. Yet another procedure employed by the prior art, which is not necessary with these impregnating solutions involves a prolonged contacting step at slightly elevated temperatures, e.g., 100° to 150°F, to promote the incorporation of active components onto the support.

In the circulation dip impregnation procedure the impregnating solution may be circulated through a bed or catalyst support particles until the required amount of the active constituents are deposited. A more dilute solution having a higher equivalent $P/MoO_3$ ratio and somewhat higher pH may be employed when using this technique and the active component concentration in the circulating solution can be replenished as necessary during the impregnation cycle in order to build up the desired concentration of active components on the support. Equivalent $P/MoO_3$ ratios as low as 0.5 and pH as high as 2.5 may be employed in this process, provided the total concentration of active constituents is reduced by a factor of at least 40% so that the equivalent Group VI and Group VIII oxide concentrations do not exceed about 17 to about 10, preferably about 14 and 4 wt.%, respectively. These reduced concentrations are necessitated by the greatly reduced stability of the impregnating solution due to the higher pH and lower $P/MoO_3$ ratios. Nevertheless, the relative ratio of the Group VIII component to the Group VI component will generally be higher in these dilute systems when an excess of impregnating medium is employed. This is particularly true in the case of molybdenum, tungsten, nickel and cobalt. It has been observed that the Group VI component combines with the substrate more rapidly than does the Group VIII component. Consequently when deposition of the active components onto the substrate is effected at least in part by adsorption - as in the single dip and circulation dip techniques - the Group VIII to Group VI component ratio required to obtain a given final composition is higher than that required in the absence of selective adsorption effects. In contrast, the final Group VIII to Group VI component ratio is determined directly by solution composition when the pore saturation of spray techniques are employed. Selective adsorption effects are not determinative in these systems.

The exact concentration of the various constituents in the solution must be determined with regard to the final catalyst composition desired, the pore volume of the support particles and the time of contact of the support particles and the stability of the impregnating solution. A wide range of active component concentrations can be employed although some limitations are imposed by the selected impregnation procedure. For example, the solutions employed in the spray impregnation or pore saturation technique are usually relatively concentrated. Active component concentrations in these systems should be equivalent to about 17 to about 30 weight-percent $MoO_3$ and 2 to about 8 weight-percent of the Group VIII metal oxide, and must be determined in relation to the desired composition of the final product.

The pH of the solution will generally vary somewhat upon the addition of the Group VIII metal salt. The degree of such variation depends primarily upon the strength of the salt anion. For example, the addition of nickelous nitrate reduces the pH of the solution somewhat. The degree of this pH reduction is greater than that experienced when sulfate salts are employed due to the fact that the nitrate is the anion of a stronger acid than sulfuric acid. As a consequence of this effect, it is generally desirable to further adjust the final pH of the solution after addition of the Group VIII metal salt to the preferred value of from 1 to about 2, preferably from about 1.3 to about 1.7. If the pH of the final solution is lower than about 1 and higher than about 2, the stability of the final solution is reduced with the consequent appearance of precipitates or crystallites.

The desired stability of the impregnating solution is easily demonstrated by spreading a thin layer of the solution on a glass slide and allowing it to dry gradually under ambient conditions. The stable solutions prepared by the procedure herein described will dry to a completely amorphous transparent film as demonstrated by X-ray diffraction examination of the resultant film. Solutions not meeting these criteria do not form transparent thin films under conditions of this test but become opaque or translucent on drying due to precipitation and/or crystallization.

As illustrated by the examples hereinafter discussed, the catalysts prepared from the less stable impregnating solutions are far less active than those prepared from the solutions herein described. It appears that these differences in activity are attributable, at least in part, to the formation of crystallites and precipitates during impregnation. It is believed that this precipitation and crystallite formation results in the segregation of the several constituents into different crystalline species and the consequent formation of heterogeneous active component deposits. This type of segregation is prevented by the use of the impregnation solutions of this invention.

The catalysts of this invention can be employed in any of the several hydrocarbon conversion systems for which catalytic composites of Group VI and VIII metals are known to be effective, such as hydrogenation, dehydrogenation, desulfurization, oxidation, denitogenation, demetallization, isomerization, cracking, hydrocracking, and the like. Hydrocarbon feeds employed in such systems include every form and molecular weight of hydrocarbon compound. However, these catalysts are most commonly used to convert hydrocarbons boiling from about 200°F to about 1,000°F. Hydrogen is generally present in the systems involving hydrofining, cracking, demetallization and the like, at partial pressures usually in excess of 50 psi, generally 100 to 3,000 psi. Conversion temperatures also vary considerably with the type of feed and the conversion desired. Most often conversion takes place at temperatures above 600°F, usually between 650° and 800°F. The preferred catalysts prepared by single-dip pore saturation with the highly stable relatively concentrated solutions exhibit such increased hydrofining activity that they can be economically employed for denitrogenating and desulfurizing feeds boiling up to about 1,000°F. Such heavy feeds could not be feasibly treated with catalysts previously available. Temperatues involved in hydrofining such high end point stocks are usually about 700°F to about 800°F. Hydrogen partial pressures of 750 to 2,000 psi are generally employed.

The following examples serve to more particularly illustrate the invention and the advantages thereof.

EXAMPLES 1-7

The cstalysts of these examples were all prepared by identical procedures, with the only variables being the proportions of the ingredients, the corresponding impregnation medium, pH and the carrier. Silica-stabilized alumina containing 4.95 percent silica was employed in Examples 1-3. Alumina stabilized with 6.63 percent silica was used in Examples 4-7. The catalysts were prepared by a single-dip procedure in which the carrier, in the form of 1/16 inch pellets, was immeresed in an aqueous impregnation solution containing ammonium heptamolybdate, nickelous nitrate hexahydrate and orthophosphoric acid, and having the equivalent oxide concentrations reported in Table 1. The particles were contacted for the designated period under 22 mm. Hg. vacuum and decanted on a No. 5 buchner funnel. The catalysts were then dried and activated by heating at a rate of 50°F/hr up to 900°F at which they were maintained for 2 hours. Each of the catalysts was activated by the preferred calcination procedure by intimately contacting the impregnated pellets with 6 to 8 SCF of ambient air at about 70°F inlet temperature per pound of catalyst per minute throughout the period of drying and calcination.

The calcination was carried out in a muffle furnace fitted with a fine screen rack on which the specimen was spread in a thin layer, no deeper than about one-half inch, through which air was passed during drying and calcining. About 500 to 1000 grams of wet impregnated catalyst particles were placed on a stainless steel screen, 15 × 15 feet square having less than 10 mesh per inch. This screen is supported on a perforated stainless steel tray positioned on a furnace rack in an electrically heated vertical draft oven having an air inlet at the base. Air was blown into the bottom of the furnace at a rate of 4 to 12 standard cubic feet per minute and passed up through the furnace and through the bed of catalyst supported on the porous screen.

The hydrofining activity of each catalyst was determined by passing a mixed gas oil over a fixed bed of catalyst at a temperature of 725°F, a pressure of 1,400 psig, space velocity of 2.0 LHSV and a hydrogen rate of 6,000 SCF/barrel of feed. The mixed gas oil feed had a boiling point range of 400° to 900°F, an API gravity of 23.2 and contained 1.19 weight percent sulfur and 0.195 weight percent nitrogen. The residual basic nitrogen in the liquid product, after scrubbing with 5 percent sodium hydroxide, was monitored and used to calculate percent activity with reference to a standard catalyst by the following equation:

($B_N$ Feed/$B_N$ Product (from "X" Cat.)) ÷ Log ($B_N$ Feed/$B_N$ Product (from Ref. Cat.)) × 100 = %Activity Percent denitrogenation was also calculated from the total nitrogen in the product averaged over the last 12 hours on the feed. Results are given in Table I in which the denitrogenation (DeN) activities are expressed as volume percent and weight percent relative to the activity of the reference catalyst. The latter is a commercial hydrotreating catalyst consisting of 16.4% $MoO_3$, 2.9% NiO, and 1.3% P on gamma alumina stabilized with 4.5 weight percent silica. This catalyst was prepared by impregnating the support with an aqueous system containing 17.4 wt.% $MoO_3$ as ammonium heptamolybdate and 3.5 wt.% NiO as nickel nitrate with a P/$MoO_3$ weight ratio of 0.085 at a pH greater than 2.6.

The volume percent activity of the catalyst of Example 1, in which the P/$MoO_3$ ratio was 0.185 and the initial pH of the impregnating solution was 1.9, was 140 percent of the reference catalyst. The catalyst of Example 2, in which the P/$MoO_3$ weight ratio in the product was only 0.11 and the initial pH of the impregnating medium was 2.0, had an activity of only 123 volume percent of the reference catalyst. On a weight percent basis the difference was even more pronounced on a weight basis of conversion, i.e., 123 versus 103. The catalyst of Example 1 was the most active even though it contained less active metal. The catalyst of Example 3 prepared at an initial solution pH of 1.3 and a P/$MoO_3$ solution ratio of 0.136 exhibited even higher activity. Example 4, similar to Example 1 in $MoO_3$ content, P/$MoO_3$ ratio and solution pH but employing a different carrier, had an activity similar to Example 1. Example 5, in which the equivalent NiO content was somewhat lower and the initial solution pH was 1.3 had lower activity than Example 4, but was still considerably more active than the low P/$MoO_3$ ratio catalyst of Example 2. Examples 6 and 7 impregnated at pH of 1.9 and 1.3 respectively, show that a further increase in the P/$MoO_3$ ratios to 0.175 and 0.21, respectively, does not result in any further increase in activity. In fact, the activities of these examples was less than that of Examples 3 and 4. The markedly higher activity of the catalysts prepared from impregnating solutions having pH values, P/$MoO_3$ ratios and active component concentrations within the prescribed limits is readily apparent by comparison with the reference catalyst produced under conditions preferred by the prior art.

EXAMPLES 8–21

These investigations were conducted to evaluate the effect of impregnating solution composition on the stability of the amorphous deposits formed in accordance with the method of this invention. Each of these solutions was prepared by dissolving ammonium heptamolybdate and phosphoric acid (85 percent) in water in the proportions reported in Table 2. The indicated amount of nickelous nitrate hexahydrate was then added to the solution. In several instances the pH of the final solution was adjusted upwardly by the addition of ammonium hydroxide in amounts sufficient to produce the indicated pH change. Each solution was aged overnight (12 hours) at 75°F in glass bottles. Equal portions of each fresh solution were also deposited on glass slides and dried gradually at 75°F. Visual observations for both of these tests are reported in Table 2.

TABLE I.—COMPOSITIONS AND DENITROGENATION ACTIVITIES OF CATALYSTS OF EXAMPLES

|  | Ex. 1 | Ex. 2 | Ex. 3 | Ex. 4 | Ex. 5 | Ex. 6 | Ex. 7 | Reference catalyst |
|---|---|---|---|---|---|---|---|---|
| Solution composition, weight percent: | | | | | | | | |
| $MoO_3$ | 17.8 | 25.4 | 20.4 | 20.4 | 20.4 | 17.8 | 19.8 | 17.4 |
| NiO | 3.9 | 4.0 | 3.7 | 3.7 | 3.7 | 3.9 | 4.1 | 3.5 |
| P | 2.5 | 2.3 | 2.8 | 2.8 | 2.8 | 2.50 | 3.5 | 1.5 |
| P/$MoO_3$ | 0.140 | 0.091 | 0.136 | 0.136 | 0.136 | 0.140 | 0.176 | 0.085 |
| pH | 1.9 | 2.0 | 1.3 | 1.3 | 1.3 | 1.9 | 1.3 | 2.6 |
| Contact time, minutes | 15 | 15 | 15 | 15 | 15 | 120 | 15 | |
| Catalyst composition, weight percent: | | | | | | | | |
| $MoO_3$ | 15.2 | 21.7 | 18.4 | 18.2 | 19.5 | 18.4 | 16.9 | 16.3 |
| NiO | 2.95 | 3.07 | 2.97 | 2.96 | 2.88 | 2.93 | 2.82 | 2.8 |
| P | 2.81 | 2.40 | 2.96 | 3.04 | 3.41 | 3.26 | 3.58 | 1.30 |
| P/$MoO_3$ | 0.185 | 0.110 | 0.162 | 0.166 | 0.175 | 0.175 | 0.210 | 0.080 |
| Activity weight of catalyst, grams | 164 | 175 | 171 | 171 | 175 | 151 | 167 | 146 |
| Volume of DeN activity | 140 | 123 | 150 | 154 | 137 | 140 | 143 | 100 |
| Weight percent of DeN activity | 125 | 103 | 128 | 132 | 116 | 127 | 125 | 100 |
| Percent DeN | 95.41 | 94.00 | 96.87 |  | 96.21 | 96.56 | 96.67 | 91.8 |

TABLE 2

| Example No. | 8 | 9 | 10 | 11 | 12 | 13 | 14 | 15 | 16 | 17 | 18 | 19 | 20 | 21 |
|---|---|---|---|---|---|---|---|---|---|---|---|---|---|---|
| Ammonium heptamolybdate, g | 41.0 | 41.0 | 41.0 | 41.0 | 41.0 | 41.0 | 41.0 | 41.0 | 41.0 | 41.0 | 41.0 | 41.0 | 25.5 | 41.0 |
| MoO$_3$, g | 33.6 | 33.6 | 33.6 | 33.6 | 33.6 | 33.6 | 33.6 | 33.6 | 33.6 | 33.6 | 33.6 | 33.6 | 20.91 | 33.6 |
| Phosphoric acid (85%), g | 7.0 | 10.4 | 12.0 | 17.0 | 17.5 | 22.0 | 22.0 | 27.0 | 27.0 | 17.0 | 22.0 | 27.0 | 6.6 | None |
| P, g | 1.88 | 2.80 | 3.23 | 4.57 | 4.70 | 5.91 | 5.91 | 7.26 | 7.26 | 4.57 | 5.91 | 7.26 | 1.77 | |
| Water approx., ml | 75 | 75 | 75 | 75 | 75 | 75 | 75 | 75 | 75 | 75 | 75 | 75 | 75 | 75 |
| pH | 4.5 | 3.5 | 2.9 | 1.7 | 1.75 | 1.6 | 1.5 | 1.4 | 1.45 | 1.75 | 1.45 | 1.20 | 3.7 | 5-6.0 |
| Nickelous nitrate hexahydrate, g | 24.0 | 24.0 | 24.0 | 24.0 | 24.0 | 24.0 | 24.0 | 24.0 | 24.0 | 24.0 | 24.0 | 24.0 | 16.5 | 24.0 |
| NiO, g | 6.16 | 6.16 | 6.16 | 6.16 | 6.16 | 6.16 | 6.16 | 6.16 | 6.16 | 6.16 | 6.16 | 6.16 | 4.24 | 6.16 |
| Total volume of solution, ml | 120 | 120 | 120 | 120 | 120 | 120 | 120 | 120 | 120 | 110 | 110 | 100 | 120 | 120 |
| pH | 3.5 | 2.3 | 1.9 | 1.3 | 1.25 | 1.15 | 1.1 | 1.05 | 1.0 | 1.3 | 1.0 | 0.9 | 2.6 | ~4 |
| Adjust pH with HN$_4$OH | None | None | None | None | 1.60 | None | 1.60 | None | 1.70 | 2.3 | 2.3 | 2.3 | None | None |
| Final volume, ml | 120 | 120 | 120 | 120 | 123.5 | 120 | 125 | 120 | 132 | 120 | 121 | 118 | 120 | 120 |
| MoO$_3$, g/cc | 0.2825 | 0.2825 | 0.2825 | 0.2825 | 0.280 | 0.2825 | 0.268 | 0.2825 | 0.255 | 0.2825 | 0.2825 | 0.2825 | 0.1742 | 0.2825 |
| NiO, g/cc | 0.0517 | 0.0517 | 0.0517 | 0.0517 | 0.0515 | 0.0517 | 0.0512 | 0.0517 | 0.057 | 0.0517 | 0.0517 | 0.0517 | 0.0353 | 0.0517 |
| P, g/cc | 0.0157 | 0.0233 | 0.0269 | 0.0384 | 0.0380 | 0.0493 | 0.0472 | 0.0605 | 0.055 | 0.0380 | 0.0472 | 0.0705 | 0.0148 | |
| P/MoO$_3$ weight ratio | 0.056 | 0.083 | 0.095 | 0.136 | 0.136 | 0.176 | 0.176 | 0.216 | 0.216 | 0.136 | 0.176 | 0.216 | 0.085 | 000 |
| Dried film on glass slide | Yellowish opaque | | | | Transparent | | (⁵) | (¹) | (²) | ¹Filmcracking | | | (³) | |
| Solution characteristics after 12 hours | (⁴) | (⁴) | (⁴) | (⁵) | (⁶) | (³) | | (⁶) | | (⁷) | (⁷) | (⁷) | (⁸) | (⁹) |

¹ Slightly opaque.
² Transparent.
³ Opaque yellow.
⁴ Crystalline deposit. Yellow fine crystalline precipitate.
⁵ Clear.
⁶ Trace sediment.
⁷ Glass bottles containing the 3 solutions were lined with crystalline material. pH is too high for stable solution.
⁸ Prec. w/yellow fines formed slowly.
⁹ White precipitate begins to form in 5-10 min. Voluminous after 1 hr.

The impregnating solutions of Examples 8, 9 and 10 were all unstable as indicated by the formation of yellowish opaque precipitates on the glass slides and the formation of yellow fine crystalline deposits in the solutions aged for 12 hours at 75°F. The observed instability is believed to be attributable to the low solution P/MoO$_3$ weight ratios, all of which are below the minimum of about 0.10 necessary to obtain the advantages of this invention. It is interesting to note, however, that these ratios are equivalent to those considered preferable by the prior art. In addition, the solutions of Examples 8 and 9 have pH values of 3.5 and 2.3, respectively, both of which exceed the maximum pH of 2.0 tolerable in these relatively concentrated solutions. The precipitate formation observed in Example 10 at a pH of 1.9 and P/MoO$_3$ weight ratio of 0.095 was much slower than that observed in either Examples 8 or 9, although the dried film definitely exhibited an opaqueness characteristic of a heterogeneous or cyrstalline system. The presence of precipitate in the aged solution was apparent after 12 hours. Although the degree of instability was reduced by reducing the pH to 1.9 in Example 10, the P/MoO$_3$ weight ratio was so far below the necessary minimum of about 0.1 that some instability was apparent in the dried film and aged solution.

Examples 11 through 14 were conducted at conditions of pH and P/MoO$_3$ ratio within the limits prescribed by this discovery and illustrated remarkable stability in both the dried films and aged solutions. A trace amount of precipitate was observed in the solution of Example 12 after 12 hours of aging at 75°F. However there was no concurrent opaqueness in the dried film and the aged solution was evidently far more stable than the solutions of Examples 8–10. The presence of the trace precipitate in the aged solution of Example 12 is attributed to the addition of sufficient ammonium hydroxide to increase the pH from the original value of 1.25 to the final value of 1.60. It is believed that the presence of ammonium hydroxide in solutions having P/MoO$_3$ ratios approaching the lower prescribed limit of about 0.1, i.e., 0.136 in Example 12, tends to reduce the stability of those solutions. This conclusion is born out by Example 14 in which sufficient ammonium hydroxide was added to the solution to increase the pH from the original value of 1.1 to a final pH of 1.60. The P/MoO$_3$ ratio in that preparation was 0.176 which was high enough to counteract the effect of base addition as indicated by the complete absence of any opaqueness or precipitate in either the dried film or aged solution.

Comparison of Examples 15 and 16 provides a dramatic illustration of the advantage obtained by increasing solution pH with basic media. The solution of Example 15 having a pH approaching the minimum prescribed limit and a P/MoO$_3$ weight ratio approaching the upper limit was somewhat less stable than the solutions of Examples 11–14. The dried film exhibited a slightly opaque appearance and trace amounts of solid sediment were present in the aged solution. Although solutions of this nature are less preferred, they are still far superior to the solutions envisioned by the prior art and illustrated by Example 20. That solution, having a pH of 2.6 and a P/MoO$_3$ ratio of 0.085 produced an opaque yellow heterogeneous deposit on the glass slide. The formation of fine yellow particulate matter was evident in the aqueous solution throughout the aging period. The significance of the poor stability of that solution is even more apparent when it is observed that the total metals concentration in Example 20 was about 85 percent less than the stable solution of this invention. Obviously the tendency toward precipitation is greater at higher concentrations. Yet the solution of this invention remained stable at concentrations about 80 percent higher than that at which substantial instability was observed in Example 20.

It should also be observed that the value of this distinction becomes even more apparent in the context of catalyst preparation systems. The savings in time and investment alone afforded by single-step impregnation techniques is perspicuous. Yet the application of such techniques requires the use of impregnating solutions of relatively high concentrations to enable the deposition of the desired amounts of active components. The markedly superior compositions of this invention enable the use of those systems to produce catalysts of superior activity.

The composition of Example 16 having a P/MoO$_3$ weight ratio identical to Example 15 and an initial pH of 1.0 was further treated by the addition of sufficient ammonium hydroxide to increase the pH to 1.70. The resultant solution was very stable and produced a completely transparent dried film. The aqueous solution remained completely clear even after aging for 12 hours.

The effect of higher pH on the stability of impregnating solutions having active component concentrations sufficient to enable the use of single-step impregnating methods is illustrated by Examples 17–19. Several P/MoO₃ ratios were investigated in these examples. All three of these solutions having pH values of 2.3 and P/MoO₃ ratios representative of the prescribed range were much less stable than the solutions of Examples 11–16. The formation of opaque cracked films and substantial crystallization in the aged solutions were observed in each instance.

The solution of Example 21 provides a contrast between the stable solutions having pH values and P/MoO₃ ratios within the necessary limits to similar prior art solutions prepared at higher pH in the absence of an acid or phosphorus.

EXAMPLES 22 and 23

These two examples illustrate the influence of aging the substrate in contact with impregnating medium on the activity of the resultant catalyst.

A solution containing 410 grams of ammonium heptamolybdate, 210 grams of 85 percent orthophosphoric acid and 220 grams of nickelous nitrate hexahydrate made up to a total volume of 950 ml, and pH adjusted to 1.3 by the addition of several ml of concentrated ammonium hydroxide was dripped from a separatory funnel onto 1,300 grams of silica-stabilized alumina extrudates in an evacuated 4-liter flask. The flask was vigorously shaken by hand during and after the addition of the solution to aid in its distribution. This volume of solution was enough to fill the pore volume of the extrudates and wet them enough so that they adhered to each other and the flask. There was no free liquid in the flask. The agitation under vacuum was continued for 20 minutes. The temperature of the wet extrudates increased from about 77°F to about 122°F during this period of time. The wetted and impregnated extrudates were divided into two parts.

A 1,000 gram portion of the impregnated extrudates which had been aged for 20 minutes was spread on a stainless steel screen tray in the Kress box muffle furnace and dried at 200°F for 16 hours. The dried pellets were then distributed on a stainless steel screen suspended within a top-opening Kress muffle furnace and heated at a controlled rate of 50°F per hour to 900°F, at which temperature they were maintained for 2 additional hours. Throughout the entire drying and calcination period ambient air, having an inlet temperature of 75°F was passed into the bottom of the furnace and over the pellets at a rate of about 7 standard cubic feet per minute per pound of catalyst.

The remaining material in the 4-liter impregnating flask was aged under ambient conditions with occasional shaking by hand for an additional 100 minutes. The impregnated and aged extrudates were then distributed on a 15 inches square stainless steel tray and placed in an oven at ambient conditions. The oven was turned on and heated to 200°F and the catalyst was held held at that temperature for 16 hours. House vacuum was applied to draw air through the oven during this period. The dried extrudates were then calcined in the Kress box-type muffle as described above. The composition and activity of these two catalysts were determined as in Example 3 and are compared in Table 3.

TABLE 3

| Example No. | Aging time, minutes | Composition, weight percent | | | Activity test | |
|---|---|---|---|---|---|---|
| | | MoO | NiO | P | Hours | Percent activity |
| 22 | 20 | 18.4 | 3.09 | 2.97 | 60 | 132 |
| 23 | 120 | 17.7 | 3.13 | 2.94 | 60 | 150 |

These results demonstrate that considerable advantage can be achieved by aging catalysts impregnated by single step pore saturation.

I claim:

1. As a stable impregnating medium an aqueous solution which forms on admixing at least one water soluble molybdenum compound, at least one water soluble compound of nickel or cobalt and an acid of phosphorus with water in proportions equivalent to 10 to about 30 wt.% MoO₃, about 1 to about 10 wt. percent nickel or cobalt oxide, and a P/MoO₃ weight ratio of 0.1 to 0.25, said solution having a pH below about 2.

2. The composition of claim 1 wherein said solution contains at least one water soluble basic material selected from ammonia, ammonium hydroxide, and the hydroxides and carbonates of nickel and cobalt.

3. The composition of claim 1 having an equivalent MoO₃ concentration of about 17 to about 30 wt. percent and an equivalent nickel or cobalt oxide concentration of about 1 to about 8 wt. percent.

4. The composition of claim 1 wherein said acid of phosphorus is orthophosphoric acid, and said molybdenum compound is selected from molybdic acid, molybdenum trioxide, ammonium heptamolybdate, ammonium phosphomolybdate and molybdenum blue.

5. The composition of claim 4 wherein said compound of nickel or cobalt is selected from the nitrates, sulfates, hydroxides, carbonates, fluorides, chlorides and bromides of nickel and cobalt.

6. The composition of claim 5 wherein said P/MoO₃ ratio is from about 0.12 to 0.23 and the pH of said solution is within the range of about 1.2 to about 1.8.

7. The stable aqueous solution which forms on admixing at least one molybdenum source selected from ammonium heptamolybdate, ammonium phosphomolybdate, molybdic acid, molybdenum trioxide and molybdenum blue, a water soluble Group VIII metal compound of nickel or cobalt, and orthophosphoric acid with water in amounts corresponding to 17 to about 30 wt.% MoO₃, 2 to about 10 wt. percent of the corresponding Group VIII metal oxide, and a P/MoO₃ weight ratio of about 0.1 to about 0.25, said solution having a pH of about 1 to about 2.

8. A method of producing a catalyst including the steps of impregnating a foraminous carrier with an aqueous solution which forms on admixing at least one water soluble molybdenum compound, at least one water soluble thermally oxidizable Group VIII metal compound of nickel or cobalt and an acid of phosphorus in water in proportions equivalent to 10 to about 30 wt.% MoO₃, about 1 to about 10 wt. percent of the corresponding Group VIII metal oxide, and a P/MoO₃ weight ratio of 0.1 to about 0.25, the pH of said solution being below about 2, and thermally activating the thus impregnated carrier.

9. The method of claim 8 wherein said Group VIII metal is selected from nickel and cobalt and said acid of phosphorus is selected from orthophosphoric, metaphosphoric, pyrophosphoric and phosphorous acids.

10. The method of claim 8 wherein said Group VIII metal compound is selected from the nitrates, sulfates, hydroxides, carbonates, fluorides, chlorides and bromides of nickel and cobalt and said molybdenum compound is selected from ammonium heptamolybdate, ammonium phosphomolybdate, molybdic acid, molybdenum trioxide and molybdenum blue.

11. The method of claim 8 wherein said molybdenum compound is ammonium heptamolybdate, said Group VIII compound is selected from the nitrates hydroxides, carbonates, sulfates, fluorides, chlorides and bromides of nickel and cobalt, said acid of phosphorus is orthophosphoric acid and said carrier comprises one of silica and alumina.

12. A method of producing a catalyst including the steps of impregnating a foraminous carrier with the solution which forms on admixing at least one molybdenum source selected from ammonium heptamolybdate, ammonium phosphomolybdate, molybdic acid, molybdenum trioxide and molybdenum blue, a water soluble Group VIII metal compound of cobalt or nickel and orthophosphoric acid with water in amounts corresponding to about 17 to about 30 wt.% $MoO_3$, about 1 to about 10 wt. percent of the corresponding Group VIII metal oxide, and a $P/MoO_3$ weight ratio of 0.1 to about 0.25, wherein the pH of said solution is below about 2.

13. The catalytic composition prepared by the method including the steps of impregnating a foraminous support with the aqueous inpregnating medium which forms an admixture of at least one molybdenum compound selected from ammonium heptamolybdate, molybdic acid, molybdenum trioxide and molybdenum blue, at least one water soluble Group VIII metal compound selected from the sulfates, nitrates, fluorides, chlorides, bromides, carbonates and hydroxides of cobalt and nickel and an acid of phosphorus with water in proportions equivalent to about 10 to about 30 weight-percent $MoO_3$, about 1 to about 10 wt. percent of the corresponding Group VIII metal oxide, and a $P/MoO_3$ weight ratio of about 0.1 to about 0.25, and calcining the resulting composite in an oxidizing atmosphere, wherein the pH of said solution is below about 2.

14. The composition of claim 13 wherein said Group VIII metal compound is present in said impregnating medium in an amount corresponding to about 2 to about 8 weight percent of the corresponding metal oxide, said molybdenum compound is ammonium heptamolybdate, said acid of phosphorus is orthophosphoric acid and the concentration of said molybdenum compound corresponds to about 17 to about 24 wt.% $MoO_3$.

15. The catalytic composition of claim 13 having an equivalent $MoO_3$ content of about 5 to about 40 wt. percent, an equivalent Group VIII metal oxide content of about 1 to about 10 wt. percent and a $P/MoO_3$ ratio of about 0.12 to about 0.25 and wherein said support contains silica or alumina.

16. The composition of claim 13 wherein said impregnated carrier is aged in contact with said medium prior to drying for at least about 30 minutes.

17. The composition of claim 13 having the equivalent oxide concentration of 10 to 20 wt.% $MoO_3$ and a $P/MoO_3$ ratio of 0.12 to 0.25.

18. The composition prepared by the method including the steps of impregnating a foraminous carrier with the solution which forms upon the admixture of water and ammonium heptamolybdate in amounts equivalent to about 17 to about 30 wt.% $MoO_3$, at least one Group VIII compound selected from the nitrates, hydroxides, carbonates, chlorides and sulfates of nickel and cobalt in total amounts corresponding to about 2 to about 8 wt. percent of the corresponding oxides, and orthophosphoric acid in an amount sufficient to provide a $P/MoO_3$ ratio of about 0.1 to about 0.25 in said solution and calcining the resultant impregnated carrier, the pH of said solution initially contacted with said carrier being below about 2.

19. The composition of claim 18 wherein said salt of said Group VIII compound is selected from nickel nitrate and cobalt nitrate and said foraminous support is aged in contact with said solution for at least 30 minutes.

20. A catalyst prepared by the method including the steps of impregnating an alumina containing support with a solution formed on the admixture of water and at least one molybdenum compound selected from ammonium heptamolybdate, molybdic acid, molybdenum trioxide and molybdenum blue in amounts sufficient to provide an equivalent $MoO_3$ concentration of about 17 to about 30 wt. percent, at least one Group VIII compound selected from the nitrates, hydroxides, carbonates, sulfates, fluorides, chlorides and bromides of nickel and cobalt in amounts corresponding to about 2 to about 8 wt. percent of the equivalent oxide, and orthophosphoric acid in amounts sufficient to provide a $P/MoO_3$ weight ratio of from about 0.1 to about 0.25 in said solution at a temperature and for a period of time sufficient to produce a catalyst having an equivalent $MoO_3$ content of about 5 to about 40 wt. percent, an equivalent nickel and/or cobalt oxide content of from about 1 to about 10 wt. percent, and a $P/MoO_3$ weight ratio of from about 0.12 to about 0.25 and calcining the thus impregnated support, wherein the pH of said solution initially contacted with said support is below about 2.

* * * * *